Sept. 29, 1964   W. H. PAYNE ET AL   3,150,565
EXPANSION ENGINE
Filed June 16, 1960   5 Sheets-Sheet 5
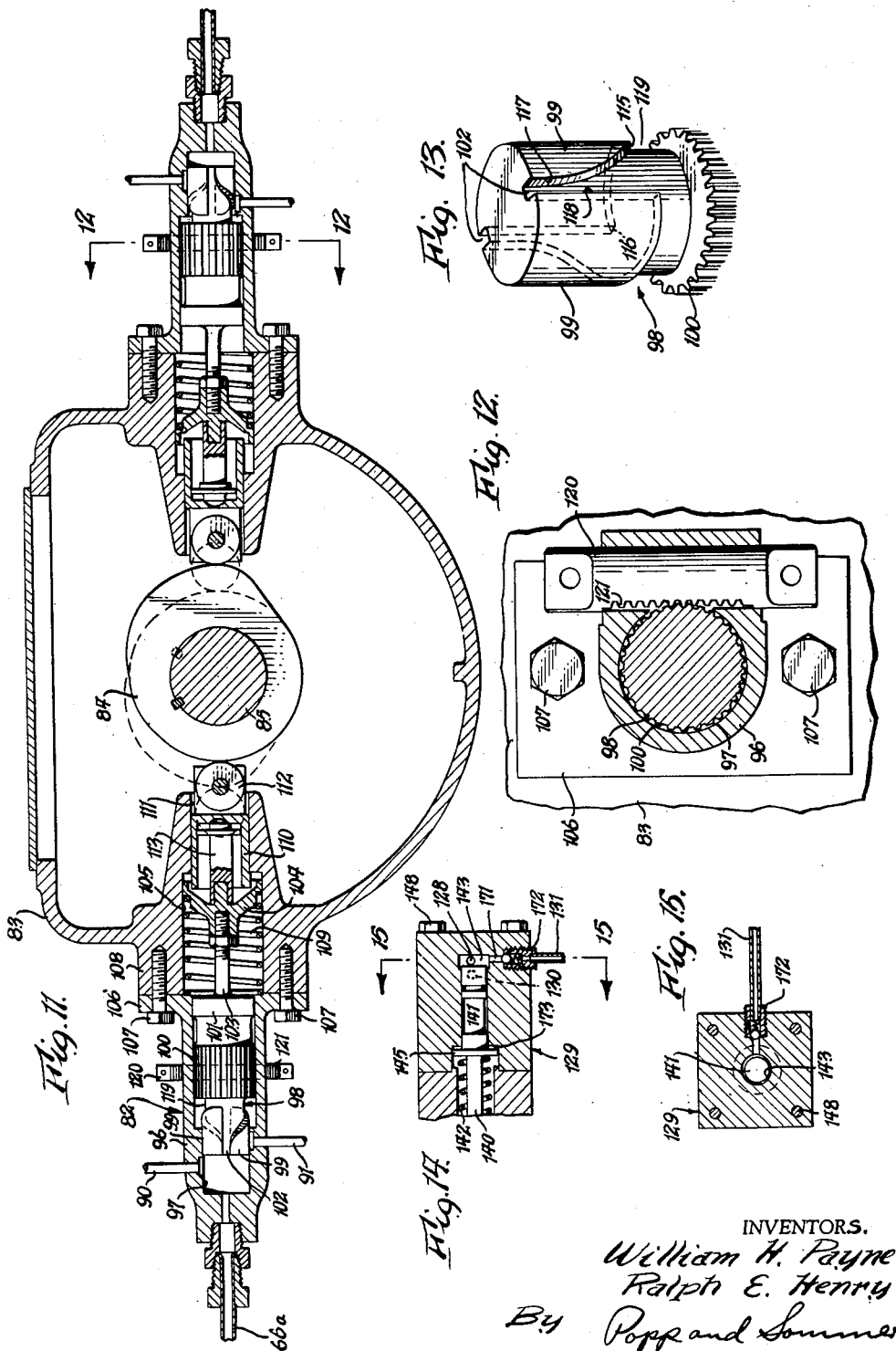
INVENTORS.
William H. Payne
Ralph E. Henry
By Popp and Sommer
Attorneys.

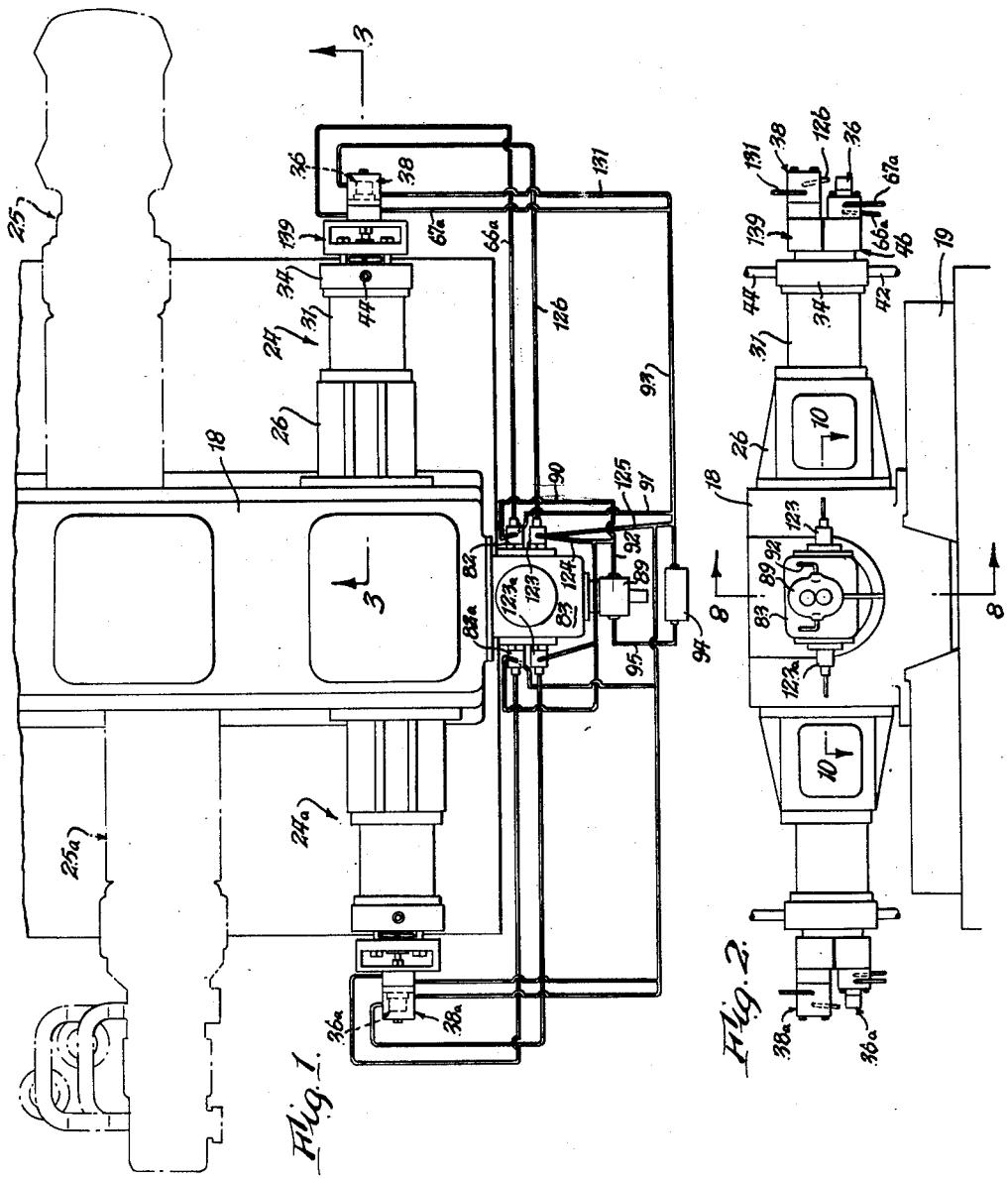

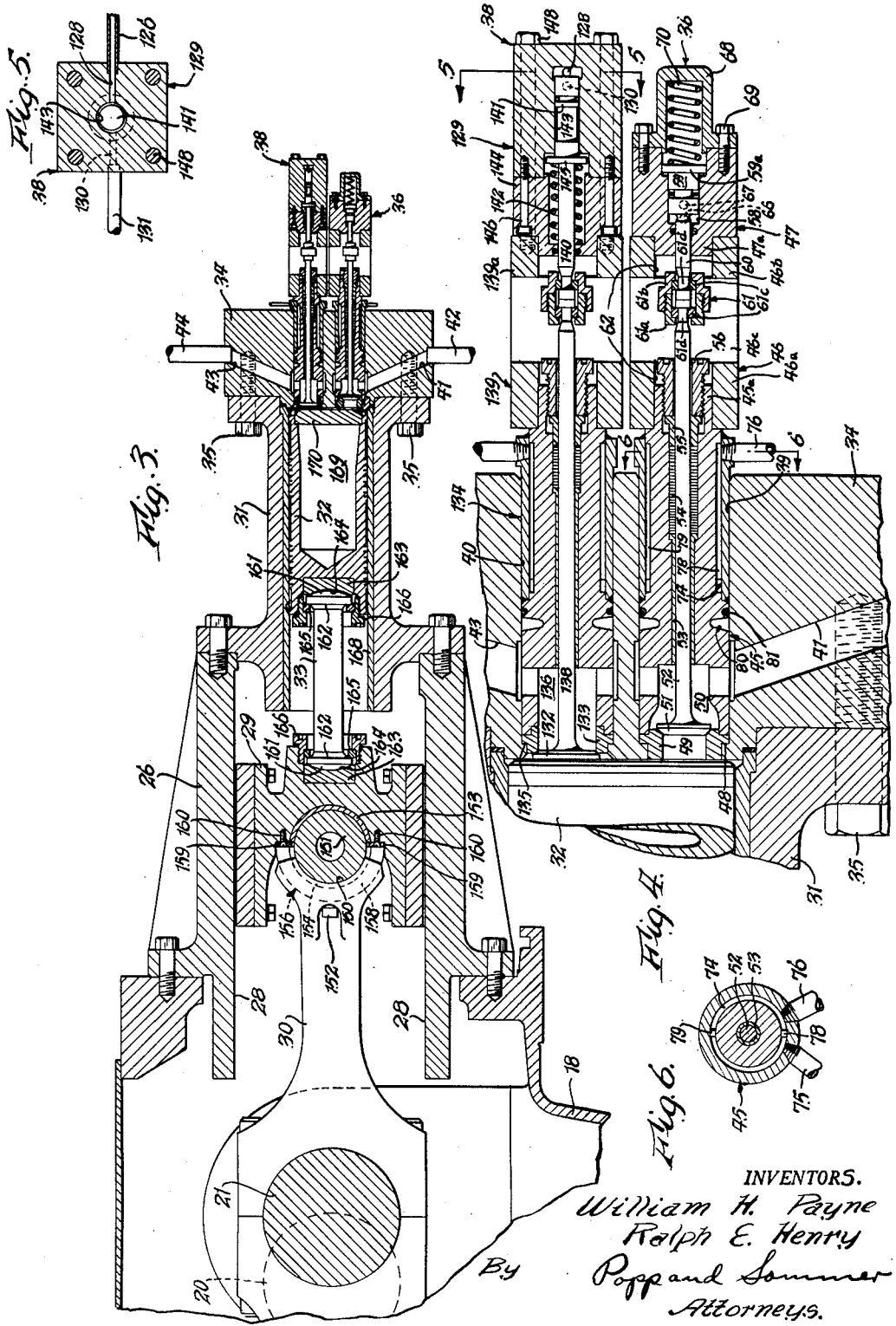

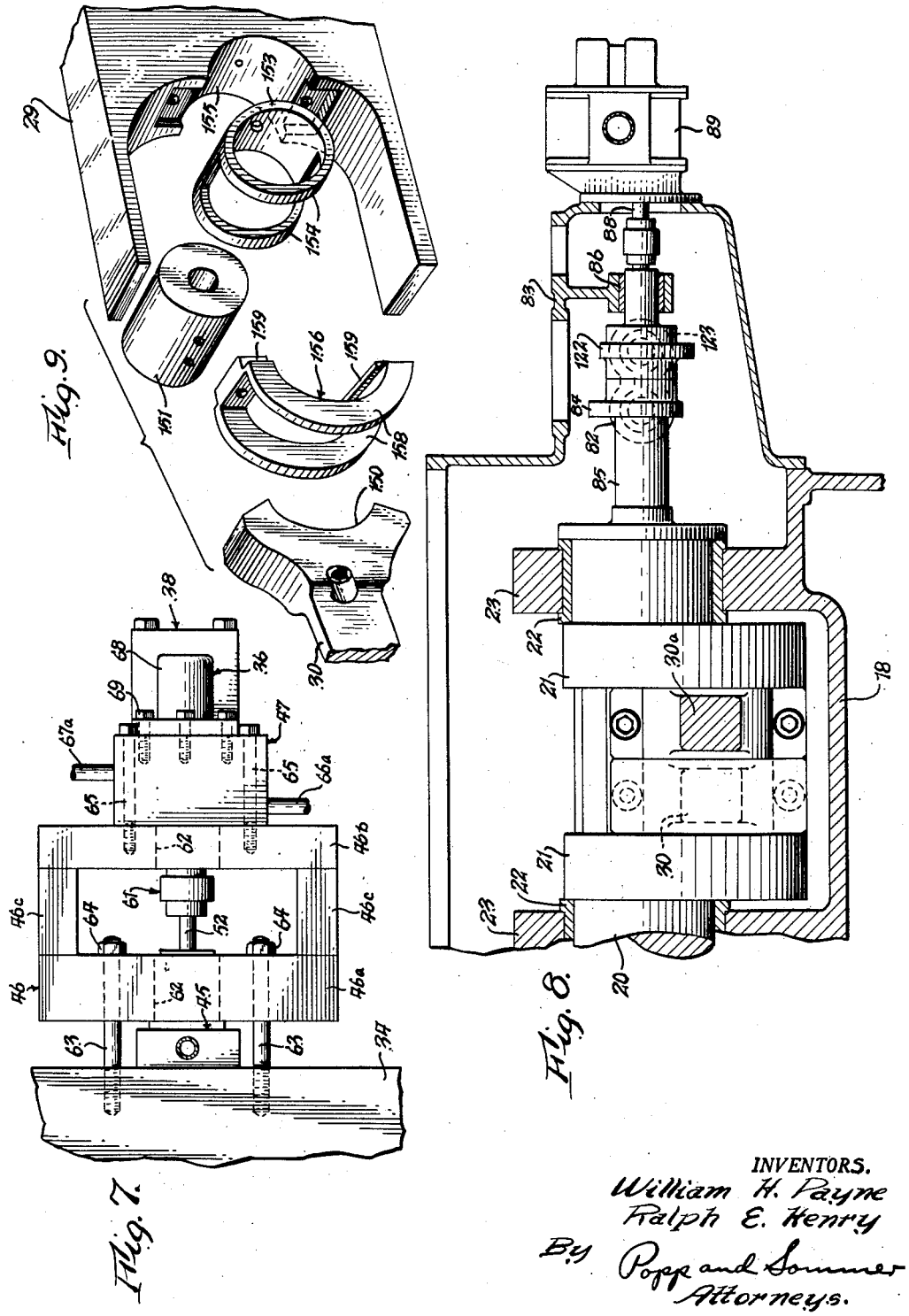

United States Patent Office 3,150,565
Patented Sept. 29, 1964

3,150,565
EXPANSION ENGINE
William H. Payne, Olean, N.Y., and Ralph E. Henry,
Rixford, Pa., assignors to Dresser Operations, Inc.,
Whittier, Calif., a corporation of California
Filed June 16, 1960, Ser. No. 36,644
4 Claims. (Cl. 91—280)

This invention relates to improvements in engines and more particularly to reciprocating expanders.

The features of the invention are particularly advantageously employed in expansion engines applied in the liquefaction of gases such as air or nitrogen, although the engines may be used in other processing applications.

With an expansion engine used for gas liquefaction, for example, the gas at an elevated pressure is introduced into a cylinder closed at one end by a reciprocable piston and the gas is allowed to expand against the piston to move the same and develop power. The work done by the expanding gas reduces its pressure and temperature, as is desired, and following the power stroke of the piston the expanded gas is exhausted from the cylinder. The admission and exhausting of the gas is controlled by valves.

Considering the admission valve, for example, it is desired to open this valve quickly when the piston is essentially at rest or at top dead center. The time this valve remains open determines the power developed. The longer the valve is left open, the greater the power, and the shorter it is left open, the less the power. It is most important to close the admission valve rapidly so as to reduce throttling. No work is performed if energy is dissipated in throttling the gas resulting in a loss of power.

If mechanical means are employed in an attempt to actuate the valves quickly the mechanical parts must be large to develop the forces required and since the parts are physically large and heavy, inertia forces resist their quick acceleration.

Accordingly, it is an important object of the present invention to provide admission and exhaust poppet valves for an expansion engine which are actuated quickly by other than mechanical means so that inertia forces which impede the quick movement of mechanical parts are obviated. This is achieved by hydraulically actuating the valves.

Another important object is to provide a variable admission valve cutoff so that the power output of the engine can be controlled. The feature of the invention in this regard is that the hydraulic valve actuating means are easily and readily adjustable to provide variable control as desired.

A further object is to provide a valve assembly including a reciprocable valve, seat and actuator therefor which is quickly and easily removable as a unit from the cylinder head and replaced by another unitary valve assembly of similar construction so that the removed valve can be inspected or serviced and down time of the engine is minimized.

Another aim is to provide a simple structural arrangement for improving the alignment of reciprocating elements such as a piston and crosshead.

Other objects and advantages of the present invention will be apparent from the following detailed description of a preferred embodiment and accompanying drawings in which:

FIG. 1 is a top plan view of an expansion engine having a pair of reciprocating expanders, each of which is constructed in accordance with the principles of the present invention, and showing the expansion cylinders mounted on opposite sides of a compressor crankcase, as are reciprocating compressors a pair of which are illustrated by broken lines.

FIG. 2 is an end elevational view thereof.

FIG. 3 is an enlarged vertical central longitudinal sectional view through one of the reciprocating expanders shown in FIG. 1, this view being taken on line 3—3 of FIG. 1.

FIG. 4 is a still further enlarged central longitudinal sectional view of the valve assembly shown at the right in FIG. 3.

FIG. 5 is a transverse sectional view thereof taken on line 5—5 of FIG. 4.

FIG. 6 is a transverse sectional view thereof taken on line 6—6 of FIG. 4.

FIG. 7 is an enlarged fragmentary bottom plan view of the outer end portion of the right hand reciprocating expander shown in FIG. 1.

FIG. 8 is an enlarged fragmentary vertical sectional view of the crankcase and showing the crankshaft and certain associated parts arranged therein, this view being taken generally on line 8—8 of FIG. 2.

FIG. 9 is an exploded perspective view of the means for pivotally connecting the outer end of the connecting rod to the crosshead shown in FIG. 3.

FIG. 11 is a vertical transverse sectional view thereof, taken on line 11—11 of FIG. 10.

FIG. 12 is an enlarged vertical transverse sectional view thereof, taken on line 12—12 of FIG. 11.

FIG. 13 is an enlarged perspective view of one end portion of a plunger which forms an element of the variable control mechanism for operating one of the valve assemblies.

FIG. 14 is a fragmentary sectional view similar to the right hand end portion of the upper valve assembly shown in FIG. 4 and illustrating a modification thereof.

FIG. 15 is a transverse sectional view thereof taken on line 15—15 of FIG. 14.

Figure 10:
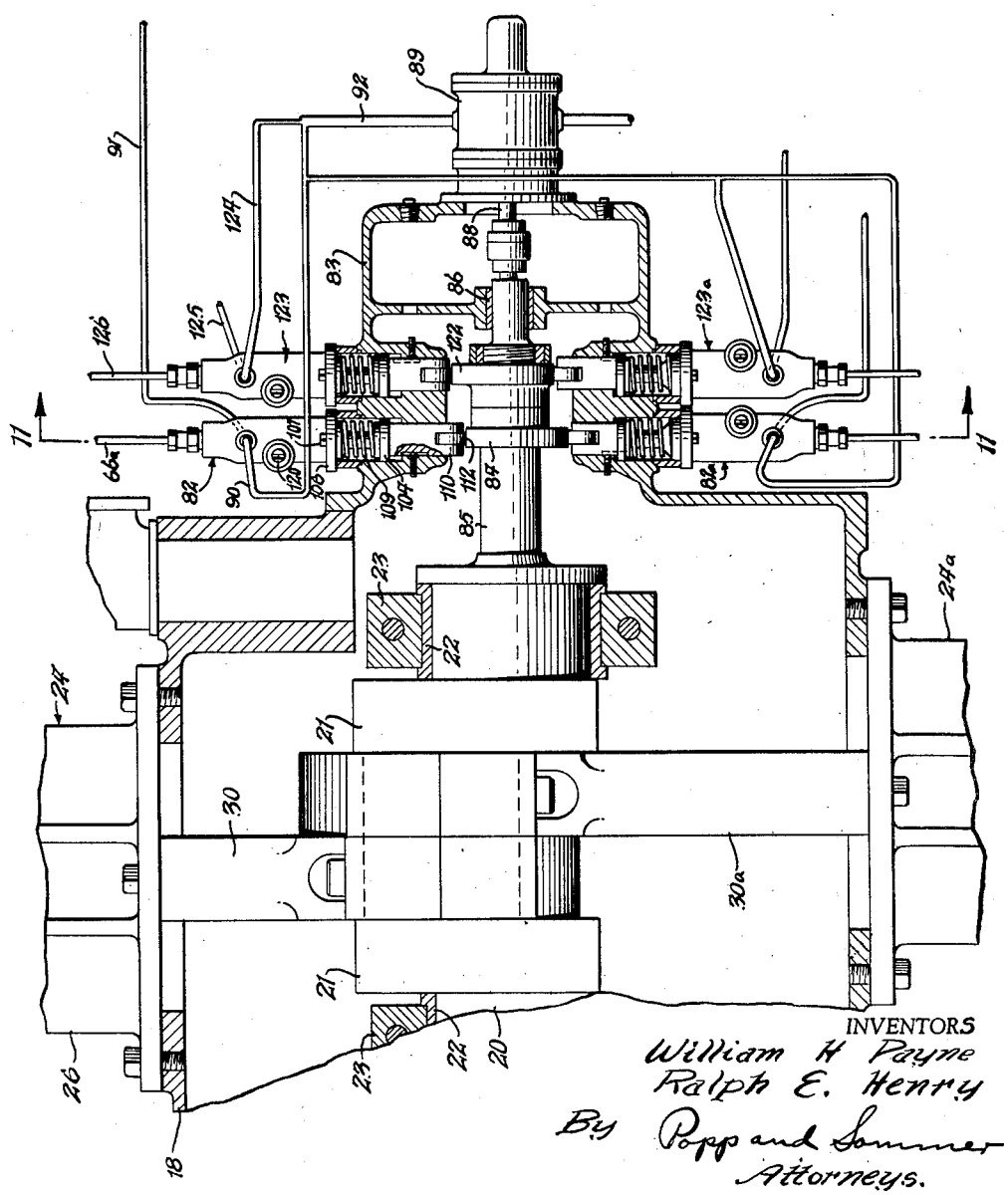
FIG. 10 is an enlarged fragmentary horizontal sectional view of the variable control valve actuating mechanism at the outer end of the crankshaft, this view being taken generally on line 10—10 of FIG. 2.

The numeral 18 represents a crankcase suitably rigidly supported on a concrete base 19. Within this crankcase 18 is a crankshaft 20 rotatable about a horizontal axis and having crank throws along its length such as indicated at 21 and journalled in bearings 22 severally held by blocks 23 supported on the crankcase, as shown in FIGS. 8 and 10.

Referring to FIG. 1, a reciprocating expander indicated generally at 24 is arranged on one side of the crankcase 18 and a similar reciprocating expander 24a is illustrated on the opposite side of the crankcase. Elements within these expanders are drivingly associated with the crankshaft 20 as later to be explained. In addition to the expanders 24 and 24a, one of a plurality of pairs of reciprocating compressors is illustrated in FIG. 1 as also mounted on opposite sides of the same crankcase 18, the two compressors shown being designated 25 and 25a. Thus, a balanced and opposed unit is provided which supplies both compression and expansion services. An electric motor (not shown) connected to one end of the crankshaft may supply the difference in horsepower between the power provided by the expanders and that required to drive the compressors. For example, the compressors 25 and 25a may handle a gas such as air or nitrogen and supply the compressed gas after cooling to the expansion engine portion of the unit composed of the expanders 24 and 24a. By working the gas to drive the compressors, its energy is reduced and thereby the gas is further cooled which is the intended end result in the case of gas liquefaction.

Considering now in detail the construction of one of the reciprocating expanders, the right hand one designated 24 will be described and its construction is similar to that of the other 24a. Suitably connected to one side of the crankcase 18 and projecting horizontally outwardly therefrom is a distance piece 26. This piece 26 is formed internally with spaced upper and lower guide surfaces or ways 28, 28 engaged by the slides of a cross head 29 and thereby guided to move in a horizontal direction. The crosshead 29 is connected to a crank throw 21 of the crankshaft 20 by a connecting rod 30. The connecting rod for the other expander 24a is designated 30a and as shown in FIGS. 8 and 10 the connecting rods 30 and 30a are coupled 180° apart to the same crank throw 21. A similar coupling of connecting rods for the reciprocating compressors 25 and 25a with other throws of the crankshaft may be provided.

Suitably connected to the outer end of the distance piece 26 is an open ended cylinder 31 arranged with its axis horizontal. A piston 32 is slidably arranged within the cylinder 31 and is connected to the cross head 29 by a strut rod 33 in a manner to be explained later. The outer end of the cylinder 31 is closed by a cylinder head 34, the same being secured to the cylinder by means of screws 35.

It is on this cylinder head 34 that a valve assembly embodying certain features of the present invention is arranged. Two such valve assemblies, an admission valve assembly indicated generally at 36 and an exhaust valve assembly indicated generally at 38, are shown as arranged on such cylinder head 34. The cylinder head 34 is shown as provided with a pair of closely spaced cylindrical and horizontal holes or bores 39 and 40 which extend completely through the head. The hole 39 receives the inner portion of the admission valve assembly 36 and the hole 40 receives the inner portion of the exhaust valve assembly 38. Adjacent the hole 39, the cylinder head is provided with a fluid supply channel 41 which is in communication with an inlet pipe 42 leading to any suitable source of pressurized gas, such as the compressors 25 and 25a to be expanded within the expanders. On the opposite side of the cylinder head, the same is provided with a fluid channel 43 communicating at its outer end with an outlet pipe 44. This outlet pipe 44 conducts gas which has been expanded and cooled within the cylinder 31 to other processing apparatus (not shown).

The admission valve assembly 36 is shown as comprising interfitting inner, intermediate and outer body members 45, 46 and 47, respectively. The hole 39 in the cylinder head 34 is counterbored to provide an outwardly facing annular shoulder 48 engaged by a tubular and flanged seat member 49 suitably connected to and forming part of the inner body member 45. This member 45 is provided with a chamber 50 which jointly with the central bore of the tubular seat member 49 provided a passage having communication with the fluid inlet channel 41 and the interior of the cylinder 31. The member 49 is formed with an outwardly facing seat surrounding the aforesaid passage and adapted to be engaged by a reciprocable admission poppet valve 51 having a stem 52 which projects outwardly, axially and centrally through the inner member 45. For this purpose, this inner member 45 is provided with a central bore the inner portion of which is lined by a guide bushing 53 against the outer end of which bears a sleeve packing 54 retained by a gland 55 and follower 56 threaded to the outer end of the inner member 45. In this manner the valve stem 52 is slidably and sealingly mounted on the inner member 45. When the valve 51 is closed or seated, the passage establishing communication between the fluid inlet channel 41 and the cylinder interior is blocked, but when this valve is lifted off its seat, such a communication is established.

Fluid operated actuating means are connected to the outer end of the valve stem 52 for reciprocating the same. As shown, the outer body member 47 is formed to provide a cylinder 58 in which a reciprocable piston 59 is slidably arranged. The piston 59 has a piston rod 60 projecting through a hole in one end wall of the cylinder member 47 and this piston rod is generally parallel to the valve stem 52. The opposing ends of the valve stem 52 and piston rod 60 are connected by a coupling indicated generally at 61. This coupling is shown as comprising a pair of end members 61a, 61b having overlapping sleeve portions threaded together and each having an internal annular flange adjacent its outer end so that the inner axially facing surfaces of such flanges oppose each other and are axially spced apart. Between and engageable with such surfaces are a pair of collars 61c, one surrounding a headed neck portion 61d on the end of the valve stem 52 and the other surrounding a similar headed neck portion 61d on the end of the piston rod 60. While each collar 61c is closely embraced by the corresponding end member 61a or 61b, the hole in each collar is slightly enlarged with respect to the diameter of the corresponding neck portion 61d so that the neck and companion collar may be eccentric. This allows the two neck portions 61d and hence the valve stem 52 and actuator piston rod 60 to be laterally offset from each other. This eccentricity may have been caused, for example, by cumulative errors in machining the bores in the various body members 45–47 which are constructed separately and then later joined together. By turning one end member 61a or 61b relative to the other so as to increase the extent of overlap of their sleeve portions, their inner and opposing axially facing surfaces draw the collars 61c toward each other and in turn clamp together the contacting heads of the neck portions 61d, even though the latter may be eccentric to each other. The coupling has the feature of permitting the abutting ends of the valve stem 52 and piston rod 60 to be eccentric with respect to each other while joining the valve stem and piston rod together. Thus, any misalignment between the valve stem and piston rod is accommodated by the coupling 61.

As best revealed in FIG. 7, the intermediate body member 46 is shown as having a rectangular frame construction comprising inner and outer cross bars 46a and 46b, respectively, and a pair of spacer bars 46c. These bars are welded together to provide a rigid member. A hole 62 extends horizontally through the bars 46a and 46b. The portion of the hole 62 in the inner bar 46a receives a reduced neck 45a on the outer end of the inner body member 45. The portion of the hole 62 in the outer bar 46b receives a reduced neck 47a on the inner end of the outer body member 47. The space within the intermediate body member 46 accommodates the coupling 61 and the open sides of this space provide access to the coupling.

The intermediate body member 46 is shown as secured to the cylinder head by a pair of studs 63 which extend through holes provide in the cross bar 46a on opposite sides of the hole 62 therein. Nuts 64 on the outer ends of these studs bear against the inner surface of the cross bar 46a and are accessible through the open sides of the intermediate body member 46. Thus, by tightening nuts 64 the intermediate body member 46 is pulled down against the shoulder at the base of the neck 45a on the inner body member 45 which in turn is urged against the shoulder 48 at the inner end thereof.

The outer body member or cylinder member 47 is shown as secured to the intermediate body member 46 by a plurality of screws 65, as best shown in FIG. 7. The cylinder 58 has an inlet port 66 and an outlet port 67 spaced axially outwardly from the inlet port 66. These ports handle hydraulic liquid for operating the piston 59. Inlet port 66 is connected to pipe 66a and outlet port 67 is connected to pipe 67a.

The outer end of the cylinder member 47 is shown as closed by a cup-shaped cap 68 secured to the cylinder member by a plurality of screws 69. Housed within this cap and partially within the cylinder member 47 is a helical compression return spring 70. The outer end of this spring bears againct the end wall of the cap 68 and the inner end of the spring bears against the outer end face of the piston 59. It will be noted that the outer end 59a of the piston 59 is enlarged and movable between opposing and axially spaced stop surfaces formed on the outer body member 47.

The inner body member 45 outwardly of the fluid inlet chamber 41 is shown as provided with an annular jacket chamber 74. This chamber 74 surrounds a portion of the valve stem 52 and is adapted to have circulated therethrough a warming fluid which may be introduced through an inlet pipe 75 and removed through an outlet pipe 76, as best shown in FIG. 6. The warming fluid handled by the lines 75 and 76 is connected to any suitable system (not shown) for supplying a heated liquid. These pipes 75 and 76 communicate with portions of the jacket chamber 74 on opposite sides of a baffle 78 and a similar baffle 79 on the diametrically opposite side of the annular chamber 74. The inner ends of the baffles 78 and 79 are terminated short of the inner end of the annular chamber 74 so as to establish communication between both portions of this chamber.

Intermediate the fluid inlet channel 41 and the jacket chamber 74, the inner body member 45 is shown as formed with an annular groove 80. This groove provides a heat dam to reduce the heat exchange between the inner and outer portions of the body member 45. Between the heat dam 80 and the jacket chamber 74, an annular seal ring 81 such as an O-ring is shown as surrounding the inner body member 45 and engaging the wall of the hole 39.

An important feature of the present invention is that the admission valve assembly 36 is removable as a unit. Referring to FIGS. 4 and 7, such assembly beginning at the left comprises seat member 49 attached to inner body member 45 having its reduced neck 45a received in intermediate body member 46 attached by screws 65 to outer body member 47 which includes as the extreme right-ward member cap 68 attached by screws 69, as well as the internal components housed by these members.

It will be seen that if the lines 66a and 67a for handling hydraulic fluid and the lines 75 and 76 for handling the warming fluid, are disconnected from the valve body, and the nuts 64 are removed, the valve assembly 36 as a unit can be withdrawn from the hole 39 and replaced by a similar unit assembly, secured in position by replacing the nuts 64 and reconnecting the lines 66a, 67a, 75 and 76.

Suitable means are provided for controlling the supply of hydraulic liquid through the inlet supply pipe 66a so as to actuate the piston 59 at the desired time in each cycle of operation of the expansion engine and also to keep this piston retracted the desired length of time to provide the admission valve cut-off desired. For this purpose and as best shown in FIG. 10, a variable control pump 82 is shown suitably mounted on the side wall of a housing 83 secured in any suitable manner to one end of the crankcase 18. The pump 82 is actuated by a cam 84 fast to a coaxial extension 85 on one end of the crankshaft 20. The extension 85 rotates with the crankshaft and is shown as journalled adjacent its outer end in a bearing 86 supported by the housing 83. The outer extremity of the shaft extension 85 is shown as coupled to the coaxial shaft 88 of a hydraulic liquid supply pump 89 which may be of the gear type. The pump 82 has an inlet pipe 90, a return pipe 91 and a discharge port to which the pipe 66a is connected.

Referring to FIG. 1, the inlet pipe 90 for the control pump 82 is connected to an outlet pipe 92 for the supply pump 89. The return pipe 91 is shown as connected to the main return pipe 93 constituting the inlet line to a sump 94. The outlet of this sump is connected via the pipe 95 to the inlet of the supply pump 89. The outlet pipe 67a for the admission valve assembly 36 is shown as connected to the main return pipe 93.

From the foregoing, it will be seen that the supply pump 89 delivers hydraulic liquid under pressure through the lines 92 and 90 to the inlet of the variable control pump 82. The output of the pump 82 is delivered through the line 66a to the admission valve assembly 36. Hydraulic liquid may be dumped by the control pump 82, for a purpose and in a manner hereinafter explained, and returned to the sump 94 via the lines 91 and 93.

The construction of the variable control pump 82 can best be understood by referring to FIG. 11 which shows a longitudinal section through this valve. This valve comprises a body 96 formed internally to provide a stepped cylindrical bore 97 in which a plunger member 98 is slidably and rotatably arranged. The outer and smaller end of the cylinder 97 is in communication with the pipe 66a leading to the admission valve 36. The liquid supply line 90 leads into communication with cylinder 97, as does the return line 91, but the supply line 90 is shown positioned axially closer to the outlet or left end of the cylinder 97, as viewed in FIG. 11.

The plunger member 98 is formed at its outer end to provide a pair of lands 99, 99. The intermediate portion of the member 98 is formed as a ring gear having external teeth or splines as indicated at 100. The end of this member remote from the lands 99 is suitably contoured to provide a cylindrical guide 101 which slides in the enlarged inner portion of the cylinder 97. Projecting axially from the inner end of the plunger member 98 is a stem or rod 103 suitably connected to a cross head 104 slidably arranged in a guide chamber 105 formed within the housing 83. The valve body 96 is shown as having an attaching flange 106 at its base and screws 107 secure this flange to a boss 108 formed on the housing 83. A spring 109 is shown as operatively interposed between the cross head 104 and valve body 96. Arranged inwardly of the crosshead 104 is a slide 110 arranged in a guide way 111 formed on the housing 83. The inner end of the slide 110 carries a roller 112 which rides on and follows the profile or edge of the cam 84. A strut 113 is shown as carried by the crosshead 104 and has its remote end rounded and received in a socket formed in the slide 110.

From the foregoing, it will be seen that rotation of the cam 84 will move the slide 110, in turn moving the crosshead 104 against the urging of the return spring 109. This movement reciprocates the plunger member 98.

The outer end of the plunger member 98 has the construction shown in FIG. 13. The lands 99 are arranged on diametrically opposite sides of the plunger member 98. Each land 99 has a generally helical edge 115 which faces axially toward the splined intermediate part 100. The edge 115 begins at an inner point 116 spaced from but adjacent the splined intermediate part 100, spirals continuously through approximately 180° and terminates in a substantially straight axially extending and circumferentially facing outer portion 117. This portion 117 is opposed to and circumferentially spaced from a straight axially extending and circumferentially facing edge 118 leading to the generation point 116 for the other land 99. Thus, the space between the corresponding opposing surfaces 117 and 118 provides therebetween a groove 102 leading from the outer end face of the plunger member 98 to an annular recessed portion 119.

When the plunger member 98 is in the position shown in FIG. 11, the outer portion of the cylinder 97 is filled with hydraulic fluid admitted through the inlet pipe 90. Subsequent movement of the plunger to the left caused by rotation of the cam 84, traps a body of oil in this chamber and forces the same therefrom through the pipe 66a. This pressurizing and displacement of hydraulic liquid continues until some portion of the helical edge 115 of a land 99 becomes positioned opposite the return pipe 91. This return line 91 is then placed in connection with the space between the end of the plunger 98 and the end of the cylinder 97 via the intercommunicating annular recess 119 and groove 102, thereby venting the pressurized hydraulic fluid to the sump. Pressure within the pipe 66a thereupon collapses.

As seen previously, when hydraulic liquid under pressure is introduced by this line 66a into the inlet port 66 of the admission valve assembly 36, the piston 59 of this assembly is moved to the right as viewed in FIG. 4 thereby causing unseating of the valve 51. Such displacement of the piston 59 continues until the inner end of this piston uncovers the outlet port 67. After this occurs, excess fluid introduced into the chamber 58 via the port 66 is exhausted via the outlet port 67, the piston 59 being so hydraulically held retracted against the urging of the return spring 70. The control pump 82 delivers a volume of hydraulic liquid to the actuator cylinder 58 in excess of that necessary to displace the piston 59. When the pressure in delivery pipe 66a collapses, the spring 70 returns the actuator piston 59 and this closes the admission valve 51.

It will be seen that by changing the angular position of the plunger member 98, the helical edges 115 of the lands 99 will be presented to the port of the return pipe 91 at different axial strokes of the plunger. In this manner, the length of time the piston 59 is held retracted can be varied and hence cutoff of the admission valve.

The plunger member 98 is rotated by a control rack 120 having teeth 121 which engage those teeth 100 on the intermediate portion of the plunger member, as shown in FIG. 12. The rack 120 extends transversely of the axis of the plunger member and is suitably guided in the valve body for reciprocable movement in such transverse direction. The splined portion 100 has a sufficient axial length to remain engaged with the rack 120 while the plunger member 98 is stroked by the cam 84. The rack 120 may be actuated manually or automatically and the adjustment of this rack, it will be seen, controls the cutoff time for the admission valve.

Referring to FIGS. 8 and 10, adjacent the cam 84 is a second cam 122 suitable made fast to the shaft extension 85 and adapted to actuate the plunger of a second variable control pump 123 which is operatively associated with the exhaust valve assembly 38. The internal construction of the variable control pump 123 is similar to that described for the pump 82. The pump 123 has a hydraulic inlet pipe 124 connected to the supply pump outlet pipe 92 and also has a return line 125 connected to the main sump return line 93. The discharge port of the variable control pump 123 is connected via the pipe 126 to the inlet port 128 of the cylinder or outer member 129 of the exhaust valve assembly 38. This member 129 has an outlet port 130 connected via the pipe 131 to the main sump return line 93.

The exhaust valve assembly 38 is quite similar in construction to that previously described for the admission valve assembly 36. One difference is that the exhaust valve 132 works against an inwardly facing seat provided on an inner annular flange member 133 forming part of the inner body member 134. The seat member 133 engages an outwardly facing shoulder 135 formed by a counterbore in the hole 40 provided in the cylindrical head 34. The inner body member 134 has a chamber 136 adapted to place the fluid outlet channel 43 in communication with the interior of the cylinder 31. The support and sealing of the valve stem 138 of the exhaust valve 132, the jacketing of the inner body member 134, the provision of an intermediate body member 139, the coupling of the outer end of the valve stem 138 to one end of a piston rod 140, is similar to that described specifically for the admission valve assembly 36.

Some additional difference between the assemblies 36 and 38 exists in the construction of the outer body member 129 and its connection with the intermediate body member 139. Inasmuch as the exhaust valve 132 opens by inward motion, the piston 141 connected to the outer end of the piston rod 140 must be moved inwardly. Thus, the hydraulic actuating means are associated with the outer end of the piston 141 and the return spring 142 is arranged at the inner end of this piston. The piston 141 works in a cylindrical chamber 143 to which the inlet port 128 and outlet port 130 connect. The inner end of the cylindrical chamber 143 is closed by the member 144 formed internally to accommodate part of the return spring 142, one end of which bears against the member 144 and the other end of which bears against a collar 145 formed intermediate the piston rod 140 and piston 141. The collar 145 is permitted limited axial movement between spaced and opposing surfaces formed within the outer body member 129 of which the member 144 forms a part. This member 144 is secured to the outer body member 129 by a plurality of screws 146. The outer body member 129 is secured to the inner body member 139 by a plurality of screws 148 which pass through registered holes provided in the members 129 and 144 and screw into threaded recesses provided in the outer cross bars 139a of the intermediate body member 139.

The exhaust valve assembly 38 is also removable as a unit. Referring to FIGS. 4 and 5, such assembly beginning at the left comprises seat member 133 attached to inner body member 134, intermediate body member 139 secured by screws 148 to outer body member 129 which includes member 144 attached by screws 146, as well as the internal components housed by these members. Exhaust valve assembly 38 is secured to cylinder head 34 by studs and nuts comparable to the studs 63 and nuts 64 for admission valve assembly 36. If the lines 126 and 131 for handling hydraulic fluid and the warm fluid handling lines, comparable to lines 75 and 76, are disconnected from exhaust valve assembly 38, and the nuts therefor comparable to nuts 64 are removed, this valve assembly as a unit can be withdrawn from the hole 40 in cylinder head 34 and replaced by a similar unit assembly, secured in position by replacing the aforementioned nuts and reconnecting the aforementioned lines.

The reciprocating expanrer 24a has an admission valve assembly 36a and also an exhaust valve assembly 38a similar to the valve assemblies 36 and 38 and these assemblies have operatively associated therewith variable control pumps 82a and 123a similar to the pumps 82 and 123, respectively. These pumps 82a and 123a are actuated by the cams 84 and 122 and are 180° out of phase with the similar variable control pumps 82 and 123 associated with the other expander 24.

Referring now to the details of the pivotal connection between the connecting rod 30 and crosshead 29, the same is best illustrated in FIG. 9. The end of the connecting rod is provided with a partial cylindrical recess 150 which receives a cylindrical knuckle 151 and secured to the connecting rod by one or more screws 152. The knuckle 151 in turn is adapted to be received within the bore of a cylindrical sleeve bushing 153 having a semi-cylindrical cut-out on that side facing the connecting rod so as to form a pair of spaced integral end rings 154. The bushing 153 is non-rotatably supported on a partial cylindrical recess 155 formed in the end of the crosshead opposing the connecting rod. The bearing 153 is held in place by a retainer 156 having spaced semi-circular end rings 158, the ends of which are connected severally by bars 159. The retainer end rings 158 receive the bushing end rings 154 which embrace the knuckle pin 151. The bars 159 of the retainer 156 are secured to the crosshead by screws 160 passing through holes provided in these bars and received in threaded recesses provided in the crosshead 29. The bars 159 have inwardly projecting marginal portions which overlap the circumferentially facing edges of the bearing 153 formed by the cut-out therein.

In this manner, it will be seen that ample bearing surface is provided between the knuckle pin 151 carried by the connecting rod 153 and the crosshead 29 in the direction of thrust when the piston 32 is driven from right to left as viewed in FIG. 3.

Another feature of the present invention is the provision of the strut rod 33 between the crosshead 29 and piston 32 and the ball and socket type connection between each end of the strut rod and the piston or crosshead. Referring to FIG. 3, each end of the strut rod 33 is formed with an enlarged head having a partial spherical convex outer surface 161 and an annular radial inner surface 162. The surface 161 engages a bearing block 163 arranged within a recess provided in either the crosshead 29 or piston 32. This bearing block 163 is provided with a partial spherical concave surface 164 which engages the spherical convex surface 161 on the strut rod 33. The spherical surfaces 161 and 164 are retained close to each other but not forced into intimate contact by a ring 165 surrounding the strut rod 33 and bearing against the surface 162 thereon. In fact, a slight clearance is provided between the surface 162 and opposing surface of the ring 165. This ring 165 is retained in position by an annular retainer 166 having a threaded engagement with either the crosshead 29 or piston 32. The aforesaid clearance is allowed to permit some rolling action between the spherical surfaces 161 and 164.

The piston 32 is shown as axially elongated and having piston rings and babbit bands on its periphery adapted to sealingly engage a cylindrical liner 168 suitably secured within the cylinder 31. The outer portion of the piston 32 or that portion adjacent the valve assemblies 36 and 38 is hollow as indicated at 169 and closed by an end wall 170. The piston 32 is so constructed for the purpose of lightening its weight and reducing heat transfer from the gas being expanded within the cylinder and the metal of the expander.

*Operation*

Assuming the crankshaft 20 to be rotating, when the piston 32 is substantially at rest or at top dead center as depicted in FIG. 3, the admission valve 51 is actuated to unseat the same and allow a gas under pressure to flow from the line 42 through the channel 41, through the passage in the body of the admission valve assembly 36, past the open admission valve 51 into the interior of the cylinder 31. At this time, the exhaust valve 132 is closed or seated.

The admission valve 51 is opened by hydraulic fluid under pressure introduced through the inlet port 66 so as to drive the actuator piston 59 to the right as viewed in FIG. 4. This pressurized hydraulic fluid is derived from the variable control pump 82 which in turn derives its hydraulic fluid from the supply pump 89. Depending upon the setting of the rack 120, the variable control pump 82 delivers a charge of pressurized hydraulic fluid into the cylinder 58 in excess of that required to fully open the admission valve 51. As the actuator piston 59 moves from left to right as viewed in FIG. 4, it will uncover the outlet port 67. When this occurs, the excess pressurized hydraulic fluid being forced into the cylinder 58 by the variable control pump 82 is allowed to escape through the outlet port 67, while maintaining the actuator piston 59 in a displaced position against the urging of the return spring 70. When the plunger member 98 of the variable control pump 82 no longer is tending to pressurize hydraulic fluid on its forward end, as when a land 99 has uncovered the dump port and return line 91, the pressure of the hydraulic fluid within the pipe 66a and cylinder chamber 58 drops or collapses. When this occurs, the return spring 70 expands to return the admission valve 51 to its seat.

From the foregoing, it will be seen that the length of time the admission valve 51 is held open depends upon the length of time the plunger member 98 of the variable control pump 82 is permitted to force pressurized hydraulic fluid into the cylinder 58 of the valve actuator means. This is controlled by the angular position of the plunger member 98 which is adjusted by the control rack 120.

In a similar manner and at the appropriate time in the cycle of operation of the expander, the cam 122 causes the desired operation of the variable control pump 123 which is associated with the actuator means of the exhaust valve assembly 38. When the exhaust valve 132 is opened by movement of the same away from its seat toward the interior of the cylinder, the expanded gas within the cylinder passes the unseated exhaust valve, passes through the chamber 136 into the fluid outlet channel 33 to a subsequent part of the processing equipment (not shown).

*Modification in FIGS. 14 and 15*

Instead of the displaced position of the piston actuator such as 141 being determined by the uncovering of an outlet port such as 130, the piston can be caused to move against a mechanical stop following which excessive pressure of the hydraulic fluid within the chamber can be relieved by a check valve. Such an arrangement is shown in FIGS. 14 and 15 which depict a modification of the outer end portion of the piston and cylinder means for the exhaust valve assembly 38 shown in FIG. 4. The same reference characters will be used to indicate like parts. It will be noted that the outlet port 171 has a check valve 172 associated therewith and this check valve is adapted to open outwardly or away from the chamber 143. Return line 131 is now associated with the outlet of check valve 172.

With this modified arrangement, fluid under pressure introduced through the inlet port 128 will drive the piston to the left against the urging of the spring 142. The hydraulic drive will continue until the annular collar 145 on the piston engages the annular stop surface 173. When this occurs and the pressure within the chamber 143 tends to rise even higher, the check valve 172 will open to relieve the excess pressure which is returned to the sump 94 via the lines 131 and 93.

From the foregoing, it will be seen that the present invention achieves the stated objects. The embodiment shown and described is intended to be illustrative and not limitative of the invention, the scope of which is to be measured by the appended claims.

What is claimed is:

1. In an engine including a cylinder head having a fluid channel and a bore extending therethrough and intercepting said channel so as to place the same in communication with the cylinder interior, said bore being counterbored to provide an outwardly facing shoulder, the combination therewith of a valve assembly removably arranged as a unit in said bore, said assembly comprising a body engaging said shoulder and having a passage establishing communication between said channel and cylinder interior and also having a valve seat surrounding said passage, a valve, yieldable means urging said valve to engage said seat, a fluid operated actuator for unseating said valve, and means removably securing said body against said shoulder.

2. In an engine including a cylinder head having a fluid channel and a bore extending therethrough and intercepting said channel so as to place the same in communication with the cylinder interior, the combination therewith of a valve assembly removably arranged as a unit in said bore, said assembly comprising a body having a passage establishing communication between said channel and cylinder interior and also having a valve seat surrounding said passage, a poppet valve having a stem slidably mounted on said body, a piston and cylinder device for unseating said valve and having a piston rod parallel to said stem, an adjustable coupling joining said rod and stem end to end and arranged to accommodate eccentricity therebetween, and yieldable means urging said valve to engage said seat.

3. In an engine including a cylinder head having a fluid channel and a bore extending therethrough and intercepting said channel so as to place the same in communication with the cylinder interior, the combination therewith of a valve assembly removably arranged as a unit in said bore, said assembly comprising a body having inner, intermediate and outer members rigidly joined together, said inner member having a passage establishing communication between said channel and cylinder interior and also having a valve seat surrounding said passage, said intermediate member having an access opening, a poppet valve having a stem slidably mounted on said inner member, the end of said stem projecting into said access opening, said outer member having a cylinder, a piston slidably arranged in said cylinder and having a piston rod parallel to said stem, the end of said rod projecting into said access opening, an adjustable coupling joining said rod and stem end to end and arranged to accommodate eccentricity therebetween and accessible through said access opening, and spring means engaging said piston to urge said valve toward said seat.

4. In an expansion engine including a cylinder head having a fluid channel and a bore extending therethrough and intercepting said channel so as to place the same in communication with the cylinder interior, the combination therewith of a valve assembly such as an admission valve removably arranged as a unit in said bore, said assembly comprising a body having adjacent its inner end a passage establishing communication between said channel and cylinder interior and also having a valve seat surrounding said passage, a poppet valve associated with said seat and having a stem extending outwardly and slidably arranged on said body, a jacket chamber in said body surrounding said stem and through which a heat exchange fluid may be circulated, said body having an annular groove intermediate said jacket chamber and passage and providing a heat dam, and an actuator connected to the outer end of said stem for moving said valve.

References Cited in the file of this patent

UNITED STATES PATENTS

| | | |
|---|---|---|
| 519,148 | Crampton | May 1, 1894 |
| 664,114 | Atkinson | Dec. 18, 1900 |
| 1,260,816 | Savio | Mar. 26, 1918 |
| 1,361,109 | Spohrer | Dec. 7, 1920 |
| 1,594,698 | Thomas | Aug. 3, 1926 |
| 1,692,845 | Kolb | Nov. 27, 1928 |
| 2,004,146 | Wineman | June 11, 1935 |
| 2,073,385 | Blocker | Mar. 9, 1937 |
| 2,120,992 | Seiden | June 21, 1938 |
| 2,299,637 | Martin | Oct. 20, 1942 |
| 2,487,003 | Trahin | Nov. 1, 1949 |
| 2,788,777 | Clark | Apr. 16, 1957 |
| 2,821,843 | Mengelkamp et al. | Feb. 4, 1958 |
| 2,900,995 | Dickerson et al. | Aug. 25, 1959 |

FOREIGN PATENTS

| | | |
|---|---|---|
| 619,535 | Great Britain | Mar. 10, 1949 |